(12) United States Patent
Sanders et al.

(10) Patent No.: US 12,393,566 B1
(45) Date of Patent: Aug. 19, 2025

(54) SYSTEM AND METHODS FOR COMPUTATION, STORAGE, AND CONSENSUS IN DISTRIBUTED SYSTEMS

(71) Applicant: Alicorn Systems, Inc., Worcester, MA (US)

(72) Inventors: Brandon Michael Sanders, Worcester, MA (US); Natasha Wendy Levey, Londonderry, VT (US)

(73) Assignee: Alicorn Systems, Inc., Manchester Center, VT (US)

( * ) Notice: Subject to any disclaimer, the term of this patent is extended or adjusted under 35 U.S.C. 154(b) by 261 days.

(21) Appl. No.: 18/329,312

(22) Filed: Jun. 5, 2023

Related U.S. Application Data

(63) Continuation-in-part of application No. 17/091,617, filed on Nov. 6, 2020, now Pat. No. 11,711,220.

(60) Provisional application No. 62/932,862, filed on Nov. 8, 2019.

(51) Int. Cl.
*G06F 16/23* (2019.01)

(52) U.S. Cl.
CPC ................ *G06F 16/2308* (2019.01)

(58) Field of Classification Search
CPC .................................................. G06F 16/2308
See application file for complete search history.

(56) References Cited

U.S. PATENT DOCUMENTS

2020/0322444 A1* 10/2020 Stefanko ................. H04L 67/55

* cited by examiner

*Primary Examiner* — El Hadji M Sall
(74) *Attorney, Agent, or Firm* — Clocktower Law LLC; Erik J. Heels; Michael A. Bartley

(57) ABSTRACT

From the enterprise cloud to robot swarms, distributed systems are everywhere. However, because these systems are realized through the careful coupling of disparate technologies (e.g., databases, messaging systems, and application runtimes), they are difficult to create and maintain—even for experienced engineers. This is a problem because the engineers of these systems have to work harder, be better trained, and thus cost more to employ, making it harder to create new products and inventions. A solution herein is a Data Backbone that provides a single medium for processing, storing, and sharing data in near-real-time. By combining these features into a single medium, the Data Backbone consolidates the functionality of several disparate tools into one system.

18 Claims, 13 Drawing Sheets

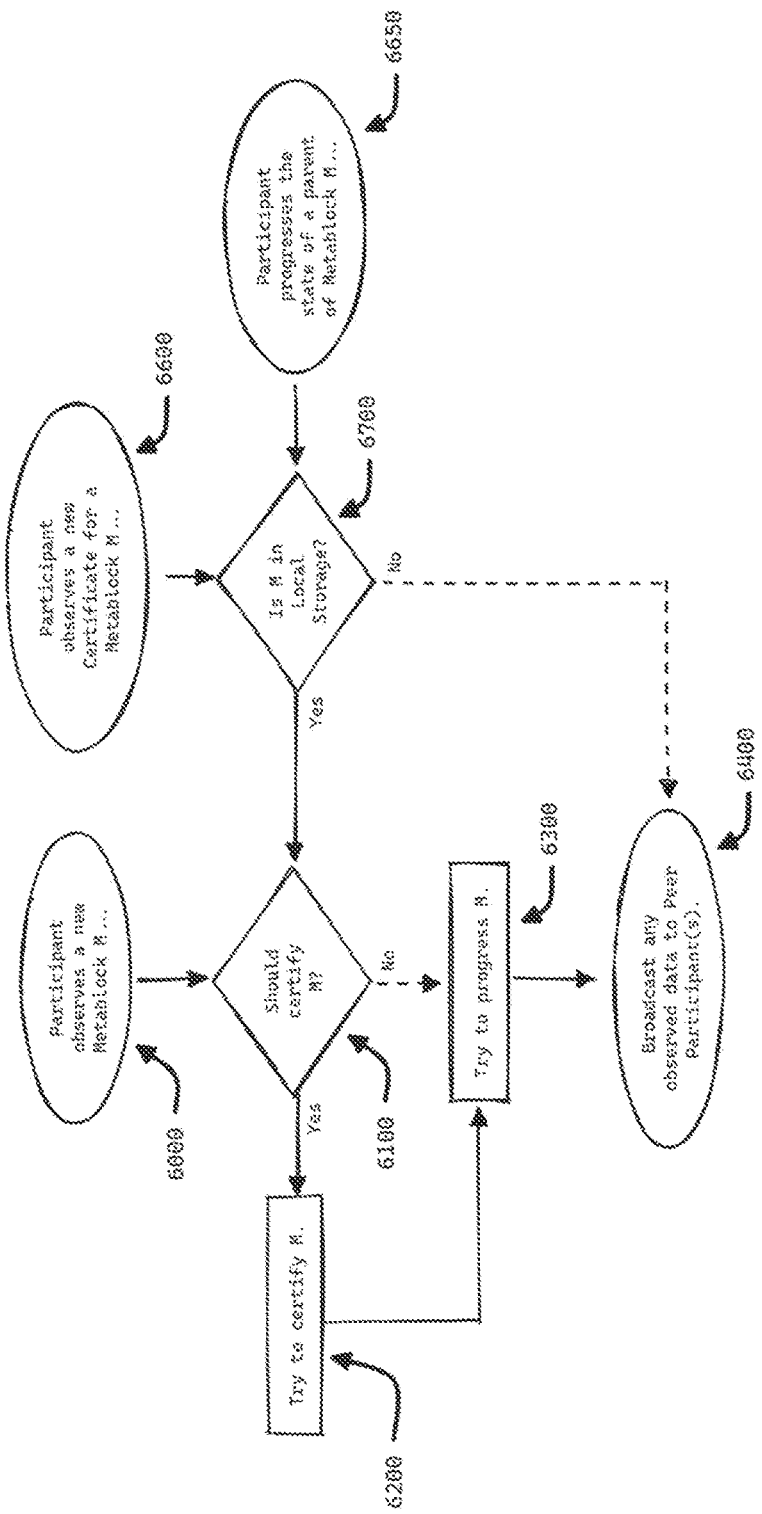

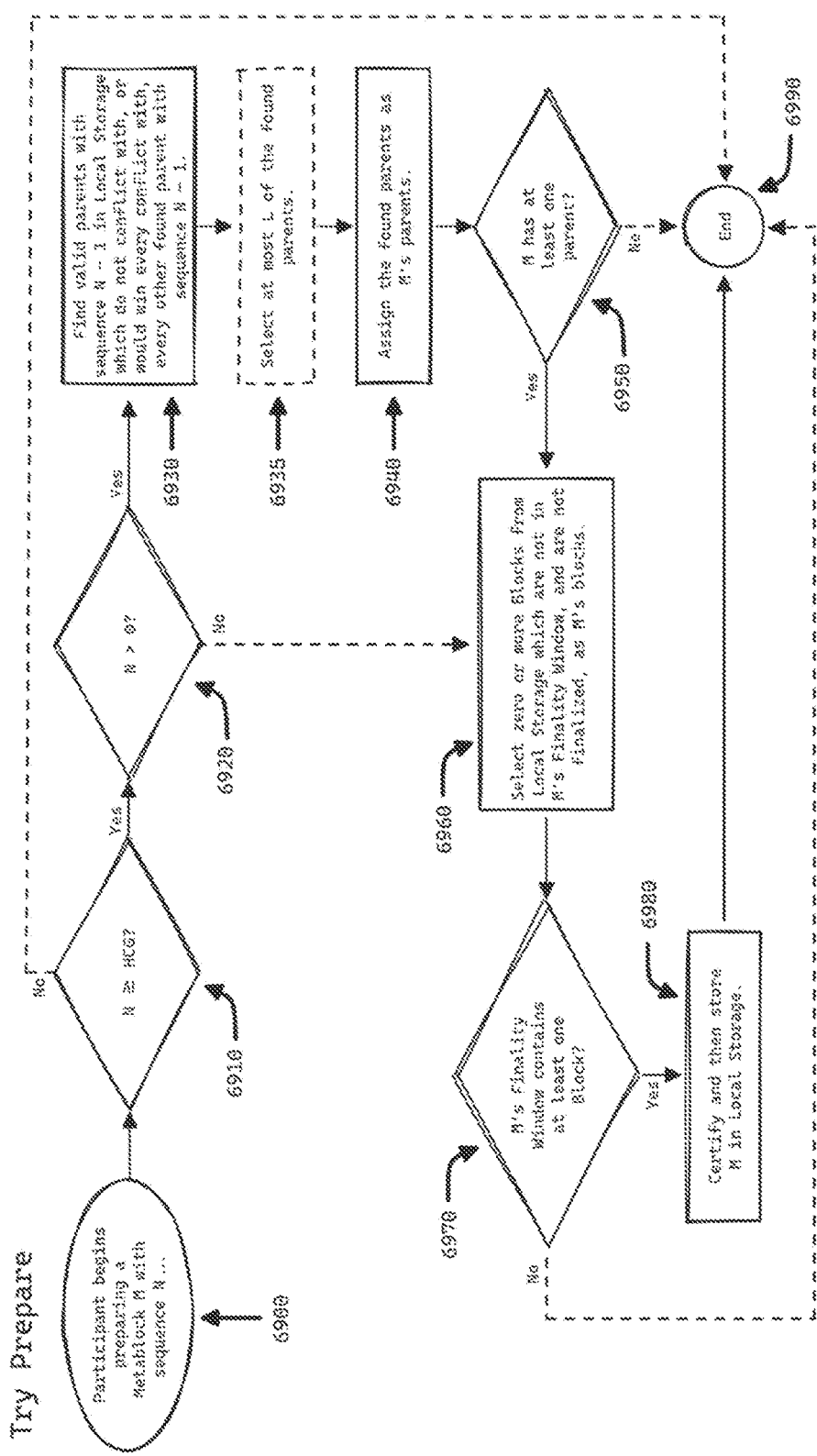

Fig. 7

| Saga State | |
|---|---|
| previousState | A Reference to a Saga State. |
| stage | A Reference to a Saga Stage. |
| consumedEntry | A Reference to an Entry. |
| producedEntries | A list of References to zero or more Entries. |
| sagaDescription | A Reference to a Saga Description. |

← 720

| Saga Stage | |
|---|---|
| behavior | A Reference to a Behavior. |
| consumedPact | A Reference to a Pact. |
| accessedPacts | A list of References to zero or more Pacts. |
| producedPacts | A list of References to zero or more Pacts. |

710

| Saga Description | |
|---|---|
| stages | An ordered list of References to one or more Saga Stages. |
| initiatingPact | A Reference to a Pact. |
| statePact | A Reference to a Pact comprising the fields of a Saga State. |

← 700

SYSTEM AND METHODS FOR COMPUTATION, STORAGE, AND CONSENSUS IN DISTRIBUTED SYSTEMS

CROSS-REFERENCE TO RELATED APPLICATIONS

This utility patent application is a continuation-in-part of and claims priority from U.S. patent application Ser. No. 17/091,617, filed Nov. 6, 2020, titled "System and Methods for Computation, Storage, and Consensus in Distributed Systems", and naming inventor Brandon Michael Sanders, which claims priority from U.S. provisional patent application Ser. No. 62/932,862, filed Nov. 8, 2019, titled "Method and System for Aggregating Computation, Storage, and Consensus in Distributed Systems", and naming inventor Brandon Michael Sanders.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2023, Alicorn Systems, Inc.

BACKGROUND

Field of Technology

The systems and methods disclosed herein relates to distributed systems.

Background

Existing container orchestration technologies (e.g., Kubernetes, Argo, and Docker Swarm) are designed to coordinate the provisioning and execution of virtual machines or containers. However, these technologies are less concerned with the management of data, and more concerned with the management (not the creation) of hardware resources and Distributed Applications (e.g., pre-defined processes or programs which may execute on one or more computers and/or systems in parallel, preferably in an orchestrated or coordinated way), making them only a small piece of a greater distributed system solution.

Distributed database technologies (e.g., Aerospike, Snowflake, Firebase, and MongoDB) provide fast, reliable, and high-volume data storage and security, but they are not designed to aid engineers in the development of Distributed Applications.

Messaging system technologies (e.g., Protocol Buffers, DDS, and Kafka) provide tools for describing, ingesting, and routing data between members of a distributed system, but they often integrate only loosely with application runtimes. Furthermore, these technologies do not typically address the issue of storing data long-term or creating and/or applying Distributed Applications to process data.

In-memory data grid technologies (e.g., Apache Beam, Apache Cassandra, Apache Airflow, Hazelcast, and Apache Hadoop) provide mechanisms for storing data, distributing data between Peers in a distributed network of systems, and, to a limited degree, creating and/or applying Distributed Applications process to data. However, these technologies do not typically provide long-term data storage solutions or complete runtimes for executing complex Distributed Applications.

Distributed actor frameworks (e.g., Akka and Microsoft Orleans) provide mechanisms for storing data, distributing data between Peers in a distributed network of systems, and executing complex Distributed Applications. However, these technologies do not typically provide long-term data storage solutions without additional technologies (e.g., distributed databases), and do not typically provide mechanisms for achieving distributed consensus on data and Distributed Application state.

Distributed ledger technologies (e.g., Bitcoin, Ethereum, Iota, and Algorand) provide data storage and consensus mechanisms using a "trustless" model. However, many of these technologies are infamous for their complex (or absent) Distributed Application runtimes, impractically slow runtime performance, and/or poor linear scalability, making them unideal for most forms of distributed systems in use today.

Web application frameworks such as Spring or Micronaut provide—whether directly or through integrations—nearly complete ecosystems for creating Distributed Applications for specific categories of distributed systems (web services). However, they often do so by requiring engineers to combine multiple disparate technologies, and thus become less performant, become more complicated to use as the scope and scale of an application grows, and become one complex system comprised of many disparate systems.

Existing technology has shown how to execute a Distributed Application in the context of a Blockchain: such as using a Directed Acyclic Graph (DAG) to locally order and execute Blockchain-based transactions in parallel after consensus has been reached, using a turing-incomplete script to apply rules to a transaction before executing it, or storing, distributing, and executing smart contracts and "chaincodes" within a Blockchain-based system.

Referring to FIG. 9A, consider an example where a Distributed Application is used to order a product from a warehouse. The application may be comprised of an application-specific smart contract which invokes additional smart contracts to retrieve products from the warehouse and to collect payments. To initiate an order, the customer 9000 submits a transaction 9022 to the application 9020. Once the transaction is finalized in the blockchain 9010, the application 9020 receives the transaction, and submits a new transaction 9032 to retrieve products from the warehouse inventory via a separate smart contract 9030, which successfully responds with the requested products 9034. The application 9020 then submits a new transaction 9042 to collect payment from the customer via a separate smart contract 9040, which fails to collect payment due to insufficient funds 9044. Because the application 9020 already changed the inventory of the warehouse, it must submit a "compensating" transaction 9050 to restore the inventory of the warehouse, and finally submit a transaction 9060 notifying the customer that their order failed.

It is common for smart contracts to require additional transaction ordering logic on top of a blockchain's own consensus algorithm, typically because the underlying blockchain has no knowledge or understanding of a smart contract's application logic.

None of the above provides a system with 1) data storage, 2) data consensus, 3) the ability to discover and access data regardless of its physical or logical location, 4) linear scalability (i.e., the performance of individual Data Backbone Participants does not significantly degrade in relation to the number of Participants in the Data Backbone), and 5) a runtime for executing complex Distributed Applications. What is needed, therefore, is a system that combines the features enumerated above.

BRIEF SUMMARY

The method and system disclosed herein is a complete Data Backbone that provides a single medium for processing, storing, and sharing data in near-real-time.

By combining these commonly disparate features into a single medium, the Data Backbone allows practitioners to use only one system to create a complete distributed system. This combination lends itself to implementations of the method and system disclosed herein based on a tiered architecture that uses a common data format capable of achieving high data throughput, low latency, and linear scalability. A key enabling technology of the Data Backbone is a Blockchain technology called a Metablockchain, which is based in turn on a data structure called a SIC-DAG.

Features and Advantages

Single System

Because the method and system disclosed herein combines these features into a single system, it immediately gains two advantages over the prior art: 1) The number of tools and technologies needed to develop, deploy, and support a distributed system is potentially reduced to just one tool. This simplification lowers the time-to-market for new businesses and reduces the amount of expertise required to support a system, and 2) By sharing a common data format across every layer of the system, the Data Backbone avoids the often costly (in both time and hardware resources) conversion of data between different systems and their data formats.

Both of these advantages reduce the mental burden and skill requirements of individual engineers, in turn reducing the cost to acquire, train, and retain engineering talent in organizations.

Spatial-Temporal Performance

The architecture of the method and system disclosed herein separates data into three logical "layers": 1) When data is first created or accessed, it enters a low-latency, high-throughput buffer that can support hundreds of thousands of messages per second per Participant, 2) As the buffer fills, it is drained into Blocks of messages that are digitally signed and distributed between Participants, and 3) When enough Blocks are created, their identities are recorded and ordered by the Data Backbone network within Metablocks.

This layering adds spatial and temporal characteristics to data: When data is young and not very distributed, it is very quick and easy to access or modify it. However, as data ages, it becomes slower to access and harder to modify. These characteristics reflect the underlying usage patterns of many distributed systems, which rely on quick processing of newer data and reliable, auditable storage of older data.

Linearly Scalable Consensus

The Data Backbone's consensus algorithm relies on a technology referred to herein as a Metablockchain, which is derived from blockchain technology. The Metablockchain differs from typical blockchains on two counts: 1) Most blockchains allow only one new Block of data to enter the blockchain at once. A Metablockchain allows an infinite number (bounded only by the constraints of a Participant's resources) of non-conflicting Metablocks to enter the Metablockchain simultaneously, and 2) Most blockchains encourage or require "full nodes" to store a complete history of the blockchain, which has been shown to reduce participation in the blockchain and not scale linearly in large networks of Participants. A Metablockchain requires its Participants to only store one previous generation of Metablocks in order to participate.

These features are made possible by a data structure called a Single-generation Independently Consolidated Directed Acyclic Graph (SIC-DAG). In a system with little activity, a SIC-DAG resembles a typical blockchain data structure with a conceptually linked-list of blocks. However, in a highly active system where many blocks are added simultaneously, the SIC-DAG can "fork" and add many blocks at the same time, eventually consolidating back into a linear data structure. This fork and consolidate mechanism enables a SIC-DAG to allow an unbounded number of Blocks to enter the graph at once, instead of only allowing one at a time, drastically improving parallelism in busy systems.

Distributed, Transactional Behavior Runtime

The Data Backbone provides a framework for defining, and a corresponding runtime for executing, complex distributed Distributed Applications comprised of Behaviors which consume and produce predetermined data types within the context of the Data Backbone.

Unlike conventional distributed systems, which require the direct management of the configuration, deployment, and versioning of Behaviors, the Data Backbone's Behavior runtime presents the underlying distributed system(s) as an opaque system. When a Behavior is created and deployed to any one Data Backbone Participant, it will automatically enter the Data Backbone and propagate to any Participant(s) that are involved with the predetermined data types which the Behavior consumes and/or produces.

Critically, Behaviors may be combined into transactional sequences of Behaviors called Sagas, which provide a guarantee that if one Behavior in the sequence of Behaviors fails, the entire set of operations performed by all Behaviors in the Saga will be reversed. This functionality is a common, but difficult problem to solve in distributed systems, and is achieved by leveraging the underlying data storage and consensus mechanisms of the Data Backbone.

BRIEF DESCRIPTION OF THE DRAWINGS

In the drawings, closely related figures and items have the same number but different alphabetic suffixes. Processes, states, statuses, and databases are named for their respective functions.

FIG. 6A shows a flowchart of how an Avatar prepares and processes observed Metablocks and Certificates.

FIG. 6D shows flowchart of preparing a Metablock.

FIG. 7 shows a representation of the pacts of a Saga Description, a Saga Stage, and a Saga State.

DETAILED DESCRIPTION, INCLUDING THE PREFERRED EMBODIMENT

Figure 1:
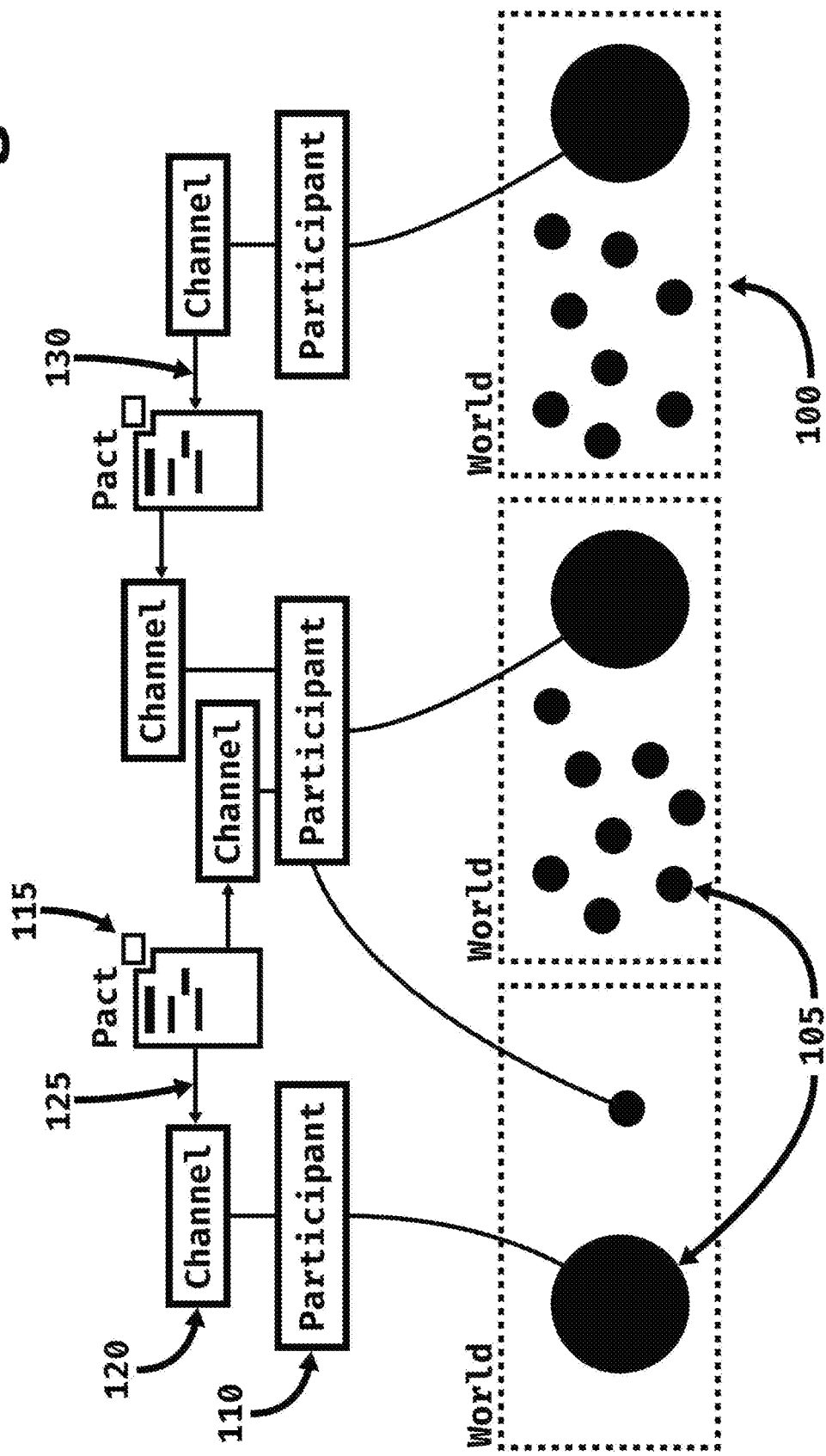
FIG. 1 shows a representation of the structure of a Data Backbone system.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

Avatar means any network-addressable interface to a Participant. Some examples of Avatars for a Participant may include a World-unique name, a public IPV4/IPV6 address, a web server (e.g., TCP or HTTP), or some other physical interface (e.g., an RS-232 serial port).

Behavior means any script, program, or application code which consumes, produces, modifies, and/or acts on data, and is capable of being executed as a part of a Distributed Application.

Block means any data structure containing a reference to a Pact, a reference to an ordered sequence of Entries defined by the Block's Pact, a reference to a list of Participants which "own" the Block, and a Certificate from the Participant that created ("issued") the Block.

Block Header means a Block where the reference to a list of entries is a Hash of the list of entries.

Bound Behavior means any Behavior that may only be executed by Participants that meet a configurable criteria.

Causal Group means the unique combination of a Sync Group and an issuing Participant. Two (or more) Blocks are in the same Causal Group if they are in the same Sync Group, and were issued by the same Participant.

Certificate means a Digital Signature accompanied by a reference to the cryptographic identity that created (or was used to create) the Digital Signature.

Channel means any connection to a Participant that allows for reading and writing Entries.

Confirmed Metablock means a Metablock which is guaranteed to not be "rolled back", and may be safely processed by a Participant.

DAG means Directed Acyclic Graph, a data structure consisting of connected nodes capable of representing parent, child, or sibling relationships without ever connecting back to themselves (e.g., nodes can never directly or indirectly be their own parents or their own children).

Data Backbone is a system that provides all of the functionality required to support a distributed application, including 1) data storage, 2) data consensus, 3) the ability to discover and access data regardless of its physical or logical location, 4) linear scalability (i.e., the performance of individual Data Backbone Participants does not significantly degrade in relation to the number of Participants in the Data Backbone), and 5) a runtime for executing complex distributed Distributed Applications.

Digital Signature means a reasonably unique collection of data resulting from the function of a cryptographic identity and an arbitrary collection of data, and which may later be verified via some method. A common example of such a signature-generating function, and corresponding signature-verifying method, is the Elliptic Curve Digital Signature Algorithm (ECDSA).

Distributed Applications are pre-defined processes or programs which may execute on one or more computers and/or systems in parallel, preferably in an orchestrated or coordinated way.

ECDH means Elliptic Curve Diffie-Hellman, which is a cryptographic key agreement protocol that allows two Peers to establish a shared secret over an untrusted network.

Entry means any structured sequence of data accessed by a Channel and defined by a Pact.

Final Saga State means a Saga State which was reached via the execution of the final Behavior in a Saga, or a Behavior which failed to execute (and is thus effectively the final Behavior in a Saga).

Finality Window means the set of all Blocks referenced by a Metablock and it's parents.

Finalized Block means a Block referenced by a Confirmed Metablock.

Finalized Entry means an Entry in a Finalized Block. Each Finalized Entry has an immutable sequence number unique to the Finalized Block's Sync Group.

Gossip Protocol means a communication protocol whereby Peers in a system re-broadcast messages they receive, allowing information to spread from one end of the system to another.

Hash means the action or result of a one-way operation or function that converts an arbitrary collection of data into a unique sequence of bytes. Examples of hash functions include MD5 and SHA-256.

HCG means Highest Certified Generation, which is a state variable maintained by a Participant indicating the highest generation which the Participant has certified a Metablock in.

HFG means Highest Finalizable Generation, which is a state variable maintained by a Participant indicating the highest generation which the Participant has observed a Finalizable Metablock in.

Local Storage means any internal, external, volatile, or persistent data storage system used by a Participant to store data.

Metablock means a node in a SIC-DAG, additionally comprising a list of references to Blocks, and a Certificate from the Participant which created ("issued") the Metablock.

Metablockchain means any SIC-DAG wherein individual nodes are comprised of Metablocks generated by Avatars from the same World.

To observe means to create, receive, or transmit a data structure.

Pact means any data schema with a unique identifier that defines the format of an Entry.

Partial Saga State means a Saga State which was reached via the execution of any Behavior in a Saga, excluding the final Behavior in a Saga.

Peer or Participant means any process or system that participates in a networked system.

Pending Saga State means a Partial Saga State for which there is no observed subsequent Partial Saga State or Final Saga State (e.g., a Pending Saga State may only exist if there is no observed "next" or "following" Partial Saga State or Final Saga State for the corresponding Saga Invocation).

Reference (when used in the context of a data structure) means a data structure or data element which may be used to "look-up" or access another data structure or data element. A non-exhaustive list of examples of References includes literal copies of the data structure or data element being referenced, a unique sequence number or serial number, a Globally Unique Identifier (GUID), a Uniform Resource Locator (URL), and a Hash. This definition of Reference is preferred because References can be reasonably expressed in a variety of ways without substantially affecting any particular embodiment disclosed herein.

Saga means a specific Saga Description.

Saga Description means any Entry in a Saga Description Pact, which is a data structure further defined herein.

Saga Invocation means the unique collection of zero or more related Partial Saga States and zero or one related Final Saga State which collectively represent the complete (or partial, with errors) invocation of the Saga Stages in a Saga Description.

Saga Runtime means the complete set of computing instructions necessary to invoke a Saga Description and its Saga Stages.

Saga State means any Entry in a Saga Description-exclusive Saga State Pact, which is a data structure further defined herein.

Saga Stage means any Entry in a Saga Stage Pact, which is a data structure further defined herein.

SIC-DAG means Single-generation Independently Consolidated Directed Acyclic Graph, which is a data structure further defined herein.

Generation (when used in the context of a SIC-DAG) means a set of all SIC-DAG nodes with the same sequence number N. For example, generation 3 would include all nodes with the sequence number 3.

Sync Group means the unique combination of a Block's Pact and the Block's owners. Two (or more) Blocks are in the same Sync Group if the Blocks have the same Pact and the same list of owners.

World means any named network of Avatars.

Operation

Referring to FIG. 1, a preferred embodiment of the Data Backbone represents unique distributed systems as named networks called Worlds 100. Each World contains an arbitrary number of Avatars 105 of Participants 110, which are physical or virtual computing systems running the Data Backbone software. Each of these Participants may have an arbitrary number of Channels 120 connected to it which pull 125 data from or push 130 data to one or more Pacts 115.

Each of these Participants resides on a computing device (e.g., a physical or virtual server running the Linux operating system; a personal computer running the Windows operating system or a smart phone running the Android operating system; or an embedded system like an Arduino or Raspberry Pi), and is implemented via a set of the computing instructions necessary to participate in a Data Backbone written using a widely available programming language (e.g., C/C++, Java, JavaScript, Python). In a preferred embodiment, a physical or virtual computing device running the Linux operating system is preferred for its widespread availability, and a set of computing instructions written using Rust and WebAssembly (WASM).

In a preferred embodiment, multiple Participants may reside on the same computing device, but having only one Participant per computing device is preferred, as a one-to-one relationship of Participant and computing resources enables better utilization of computing resources. Further, Participants may be implemented via different sets of compatible computing instructions (e.g., implemented in different programming languages or implemented via multiple inter-connected sets of instructions), but implementing them via a single set of homogeneous instructions (e.g., a single "program") is preferred to limit the physical and performance costs of maintaining multiple interconnected sets of instructions.

In a preferred embodiment, Participants' Saga Runtimes are implemented as a part of the same set of instructions used to implement the Participants themselves, and thus reside in the same set of instructions. This approach is preferred, as it limits the need to connect or combine the core components which enable a Participant to fully participate in a Data Backbone.

In a preferred embodiment, the computing device which a Participant resides on must have at least enough ephemeral storage (e.g., Random Access Memory or "RAM") connected to it for the Participant to create in-memory representations of its Pacts, these Pacts' Entry Buffers and corresponding Channels, and any additional data structures required for the Participant to participate in the Data Backbone.

In a preferred embodiment, the computing device which a Participant resides on must have at least enough durable storage (e.g., a Solid-State Hard Drive or "SSD", and/or a Hard-Disk Drive or "HDD") connected to it for the Participant to store its cryptographic identity, metadata about one or more of the Participant's Avatars (including the Avatar's cryptographic identity, one or more of the Avatar's Peer-Avatars, one or more Certificates created and/or observed by the Participant for one or more Metablocks in the Avatar's World, and at least one Metablock from the Avatar's World), one or more Pacts accessed by the Participant, one or more Blocks created and/or observed by the Participant, and any additional data structures required for the Participant to participate in the Data Backbone.

Figure 2:
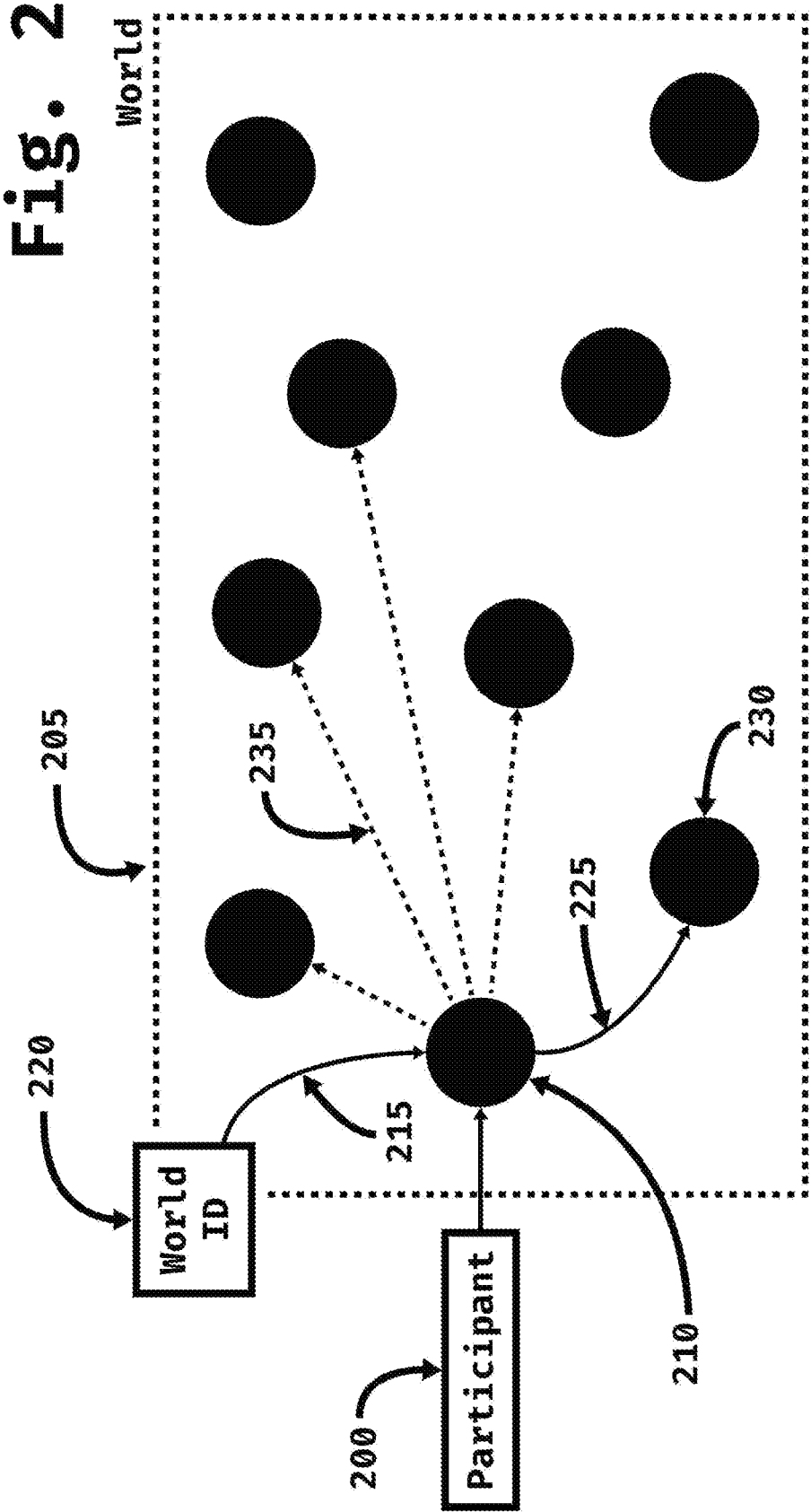
FIG. 2 shows a representation of the relationships between Avatars in a Data Backbone system.

Referring also to FIG. 2, when a Participant 200 joins a World 205 for the first time, the Participant establishes an Avatar 210 in the World. Each Avatar must have a unique cryptographic identity derived 215 from the cryptographic identifiers of the Participant and the World's unique identifier 220. The participant may then select an initial peer Avatar to connect to 230, exchanging and verifying 225 it's Avatar's unique identifier without exchanging the World's unique identifier. Once a Participant successfully joins the World via its Avatar, it may repeat this confirmation process with any other peer Participants' Avatars 235.

The precise mechanism for deriving a unique cryptographic identity and confirming the identity may be implemented in multiple ways using a variety of combinations of unique cryptographic or private information and cryptographic schemes (including Digital Signatures provided by trusted authorities in the World), depending on the requirements of the World. The present preferred embodiment uses a mechanism similar to an ECDH key agreement.

In regards to the usage of Avatars, there are only two invariants that must be met in a preferred embodiment of the Data Backbone: 1) The World's unique identifier must always remain private and never be exchanged by Participants, allowing it to be used as a simplistic form of "shared secret" (even if the World's unique identifier is publicly available out-of-band of the system itself), 2) A "confirming" Avatar 225 must be able to verify that the new Avatar's cryptographic identity 215 was created by the new Avatar's corresponding Participant 200.

This broad flexibility in terms of how cryptographic identities are derived, and how Avatars are created and confirmed, is important: As new vulnerabilities are discovered in existing cryptographic solutions, and new methods emerge, a preferred embodiment of the Data Backbone system should be flexible enough to adopt new cryptographic schemes without significantly changing the characteristics of the Data Backbone.

In a preferred embodiment, a World is merely a network formed by two or more Participants. Therefore, a new World is created implicitly when two or more Participants successfully connect to one-another. This implicit creation of Worlds eliminates the need for a central World "orchestrator" or "manager", as membership in a World is determined by agreement between individual Participants.

In a preferred embodiment, the connections between Participants (typically via their Avatars) may be achieved over the public internet or over a private internet connection. Any connection which utilizes Internet Protocol Version 4 ("IPV4") or Internet Protocol Version 6 ("IPV6") is preferred (due to their widespread adoption), and a connection which further uses the Transmission Control protocol ("TCP") is preferred for its reliable transmission of packets across the internet. An embodiment may also use the User Data Protocol ("UDP") in place of TCP to achieve higher throughput (e.g., to "stream" Blocks between Avatars), at the risk of packet loss and data corruption. If two Participants reside on the same computing device instead of separate computing devices, they may still communicate via IPV4/IPV6 and/or TCP/UDP. Participants which reside on a computing device incapable of using IPV4/IPV6 and/or TCP/UDP may also utilize "lower-level" communication protocols such as the Recommended Standard 232 ("RS-232") serial communication protocol.

Figure 3:
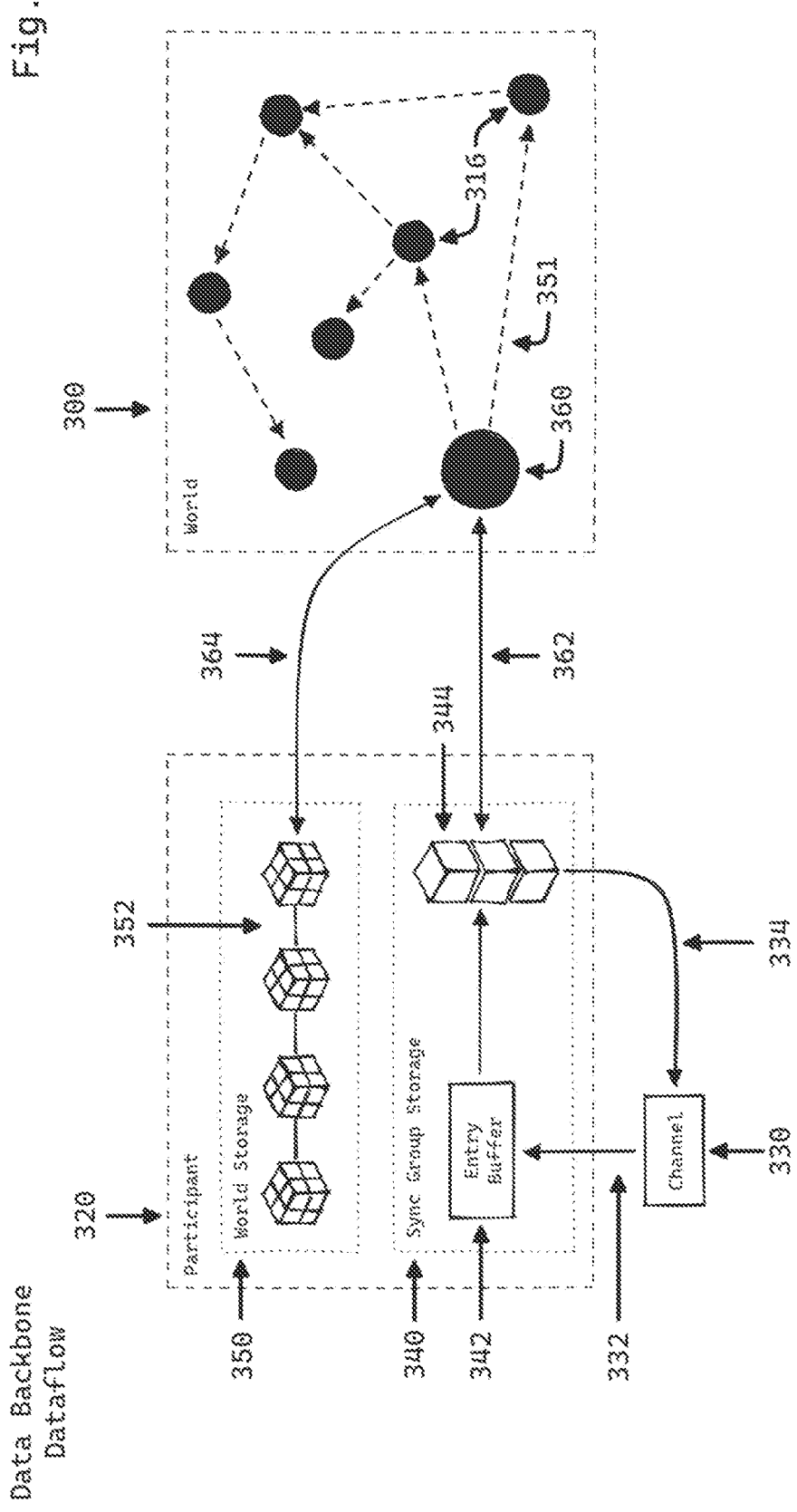
FIG. 3 shows a representation of the flow of data through a Data Backbone system.

Referring also to FIG. 3, a preferred embodiment of a Data Backbone is comprised of a World 300 containing one or more Avatars 316 of Participants 320 which are connected to by one or more Channels 330 which "push" new Entries 332 to and "pull" Finalized Entries 334 from one or more Sync Groups. For every Sync Group a Participant or its Channels access, the Participant establishes a Local Storage 340 containing an Entry Buffer 342 and a Block Stack 344. For every World a Participant connects to, it establishes a Local Storage 350 containing a Metablockchain 352.

Channels connect to Participants, which in turn map the Channels to specific Entry Buffers based on the Sync Group that the Channel accesses. It is possible for Channels to exist on other systems than the Participant, on the same system as the Participant, or even in the same process as the Participant. Each Entry Buffer is a data structure with a configurable maximum size of Entries it may store and the ability to be written to and read from multiple parallel or concurrent processes. The Entry Buffer allows multiple Channels to push and pull entries concurrently or in parallel, enabling efficient manipulation of Entries within the same Participant.

In a preferred embodiment, Channels may be implemented as an internal Application Programming Interface ("API") which a Participant exposes to other software instructions residing within the Participant's instruction set (e.g., its Avatars, Behaviors, or other coroutines), and optionally via a web service (e.g., a Hyper Text Transfer Protocol, or "HTTP", server) which non-Participants (e.g., external processes or human operators) may use to pull entries from and push entries to Channels.

When an Entry Buffer reaches a configurable level of utilization of its maximum capacity (e.g., when it becomes 90% full or when it contains enough Entries to create a desired size of Block), the Entries in the Entry Buffer are moved to a new Block certified by the Participant, and stored in the Entry Buffer's 342 corresponding Block Stack 344. This Block is signed by the Participant, and then transmitted to a number of Peer Participants 316 via the Participant's Avatar(s) 360.

In a preferred embodiment, a Participant's Entry Buffers are ephemeral data structures stored in an ephemeral resource (e.g., RAM) connected to the computing device which the Participant resides on. Further, in the preferred embodiment, a Participant's Block Stacks are durable data structures stored in a durable resource (e.g., a HDD or SSD) connected to the computing device which the Participant resides on.

At any time, a Participant may observe a new Block 362 or Metablock 364, either by creating one or by receiving one via its Avatar(s) 360. A created Metablock contains a list of references to Blocks and a Certificate from the creating Participant. If valid, Block or Metablock may be stored in the Participant's corresponding Block Stack 344 or Metablockchain 352, and then transmitted to a number of peer Participant's Avatars 316 via the Participant's Avatar(s) 360. Blocks, Metablocks, and other data in a Data Backbone are propagated across a World via a Gossip Protocol 351.

In a preferred embodiment, a Participant's Metablockchain is a collection of one or more related Metablocks stored in a durable resource (e.g., HDD or SSD) connected to the computing device which the Participant resides upon.

Figure 4:
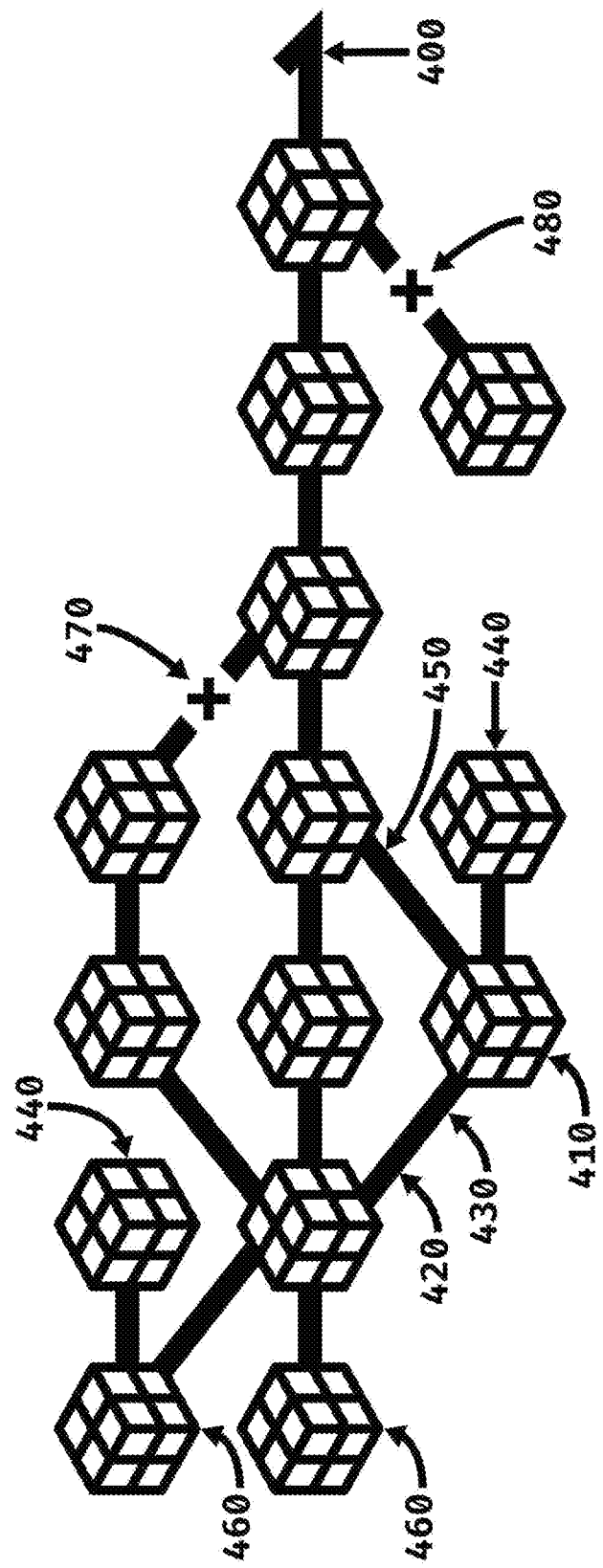
FIG. 4 shows a representation of the structure of a Single-generation Independently Consolidated Directed Acyclic Graph (SIC-DAG).

Referring also to FIG. 4, a Single-generation Independently Consolidated Directed Acyclic Graph (SIC-DAG) is a Directed Acyclic Graph (DAG) where each node with the sequence number N will have one or more nodes in the SIC-DAG with sequence number N−1 as parents, causing the SIC-DAG to converge towards a linear list of nodes 400 during each generation.

Each node 410 in the SIC-DAG is linked 420 to the previous set of parent nodes that its creator was aware of at the time of creation. When two nodes are created at similar times with one or more of the same parent nodes with the same sequence number, it is possible for the SIC-DAG to temporarily fork 430 and resemble a conventional DAG. When such a fork occurs, nodes that are not directly linked to the next generation of nodes will be orphaned and abandoned 440 and nodes that are linked will merge into the history of the SIC-DAG 450.

The following invariants must be met in the preferred embodiment of a SIC-DAG: 1) Each node must contain a sequence number N in the range 0 to infinity, 2) With the exception of the genesis nodes 460 (with N=0), each node with sequence number N must reference one or arbitrarily more valid nodes with sequence number N−1, and 3) No two nodes with the same sequence number N may be referenced by the same node with sequence number N+1 if they contain conflicting or potentially conflicting data (where conflict is defined by the specific embodiment of the SIC-DAG).

In the preferred embodiment, two SIC-DAG nodes with the same sequence number N are considered to conflict if neither node's set of parents is a subset of the other's 470, 480. This constraint ensure only nodes which refer to parent nodes known to exist in the SIC-DAG will be included in the current generation, reducing the likelihood of long-lived "forks" of the SIC-DAG.

So long as these invariants are met, the embodiment of a SIC-DAG may be implemented in a variety of ways. The SIC-DAG contained in the preferred embodiment of the Data Backbone system is referred to as a Metablockchain, as it is a SIC-DAG where each node is a Metablock.

Figure 5:
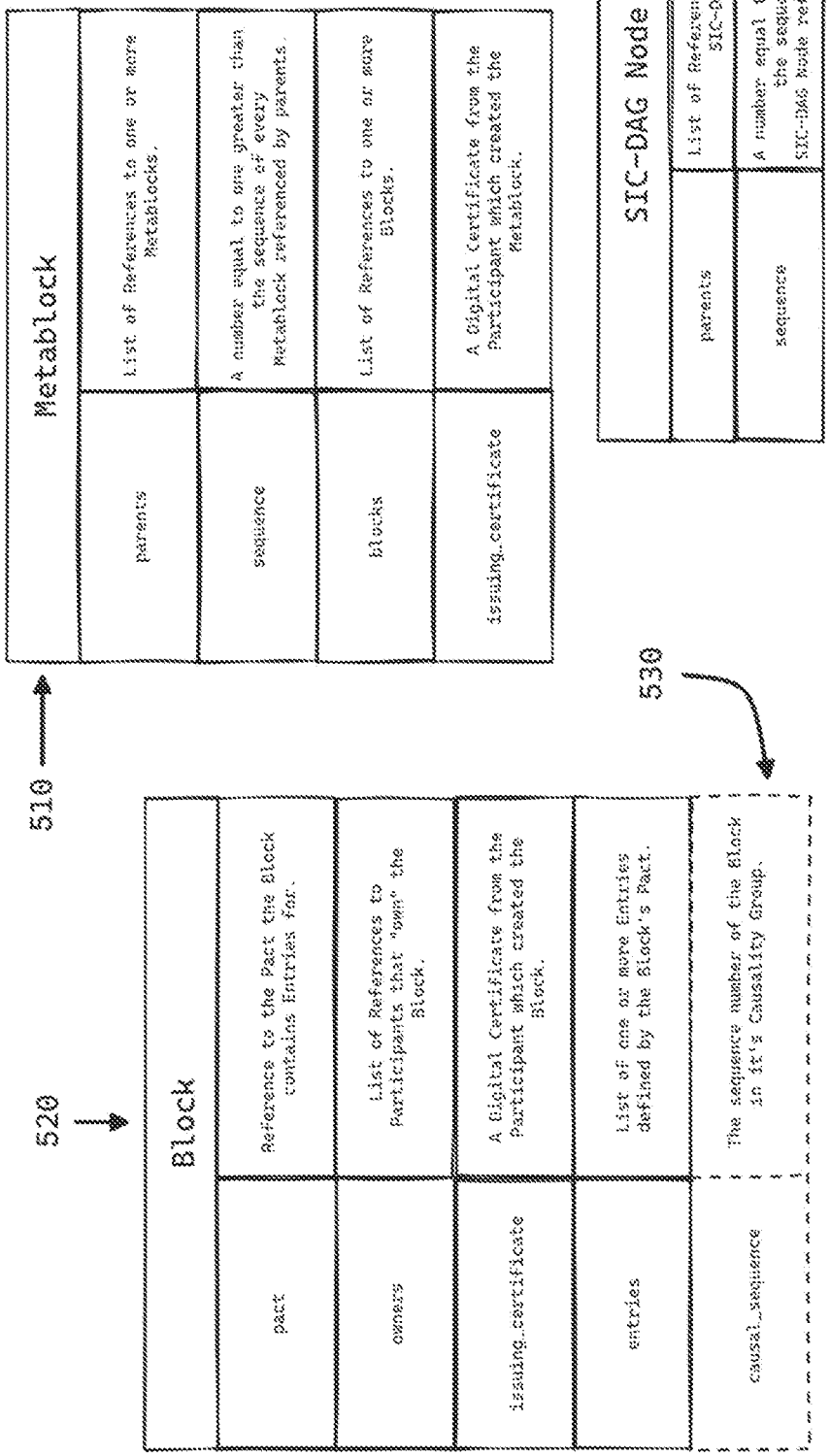
FIG. 5 shows a representation of the schemas of a SIC-DAG Node, a Metablock, and a Block.

Referring also to FIG. 5, a minimal SIC-DAG Node 500 is comprised of a list of references to one or more "parent" SIC-DAG Nodes, and a sequence number equal to one greater than the sequence number of all referenced parent SIC-DAG Nodes. A Metablock 510 is a SIC-DAG Node additionally comprising a list of references to one or more Blocks, and an "issuing certificate", which is a Certificate of the Metablock provided by the Participant that created ("issued") the Metablock (this issuing certificate should be stored in the Metablock itself). A Block 520 is comprised of a reference to a Pact, a list of references to the Participants which are "owners" of the Block, a list of one or more Entries defined by the referenced Pact, and an "issuing certificate", which is a Certificate of the Block provided by the Participant that created ("issued") the Block (this issuing certificate should be stored in the Block itself).

A Metablockchain adheres to all the invariants of a SIC-DAG, with the following additional invariants: 1) Each node in the Metablockchain is a Metablock, 2) No two Blocks referenced by the same Metablock may contain conflicting or potentially conflicting data, 3) Each referenced parent of a Metablock must exist with a state that is at least Finalizable. In a preferred embodiment, a Metablock may be in one of at least three states: Prepared, Finalizable, and Finalized (a Finalized Metablock is considered to be a Confirmed Metablock). These states have an ordering relationship, such that Prepared<Finalizable<Finalized. A Metablock is always at least Prepared, and becomes Finalizable when it has Certificates from each of the following: 1) Every owner of each Block referenced by the Metablock, 2) Two-thirds of the owners of each Block referenced by the Metablock's parents, and 3) Each issuer of each of the Metablock's parents. When a Metablock becomes Finalizable, all of its parents that are not at least Finalized become Finalized, and are considered to be Confirmed Metablocks.

In a preferred embodiment, two Metablocks A and B with the same sequence number N conflict if any of the following statements are true: 1) A and B were issued by the same Participant, 2) A and B reference a Block in the same Sync Group, 3) Neither A's parents nor B's parents are a subset of the other's, or 4) The same Block is in both A's and B's Finality Windows.

In a preferred embodiment, two predicates are used to validate Metablocks: A "Was Certifiable" predicate, and an "Is Certifiable" predicate. A Metablock M "Was Certifiable" if all of the following statements are true: 1) M contains valid data, and 2) All of M's parents are at least Finalizable. A Metablock M with sequence number N "Is Certifiable" by a specific Participant P if all of the following statements are true: 1) M "Was Certifiable", 2) N>P's HCG, 3) N>P's HFG, and 4) All of M's parents that P has previously certified don't conflict, or would win conflict resolution with, every Metablock with sequence number N−1 previously certified by P. These predicates may be implemented as part of a Participant's set of computing instructions, or as a coroutine that may be updated separately from a Participant (e.g., as a Behavior stored in the Metablockchain itself); the exact predicates described in this paragraph are intended to be illustrative, and may be modified if and when better (i.e., faster or simpler) methods of ensuring "safety" and "liveness" during consensus are identified.

Referring also to FIG. 6A, when a Participant observes a Metablock M 6000, the Participant will check if it "Should Certify" M 6100. A Participant may certify any Metablock, but it only "Should Certify" Metablocks which require a certificate from the Participant to achieve the Finalizable state. If the Participant "Should Certify" M, it will try to certify M 6200, try to progress the state of M 6300, and finally broadcast (e.g., "gossip") M to zero or more of its peers 6400. If the Participant shouldn't certify M, it will skip certifying M and immediately try to progress the state of M 6300.

Figure 6B:
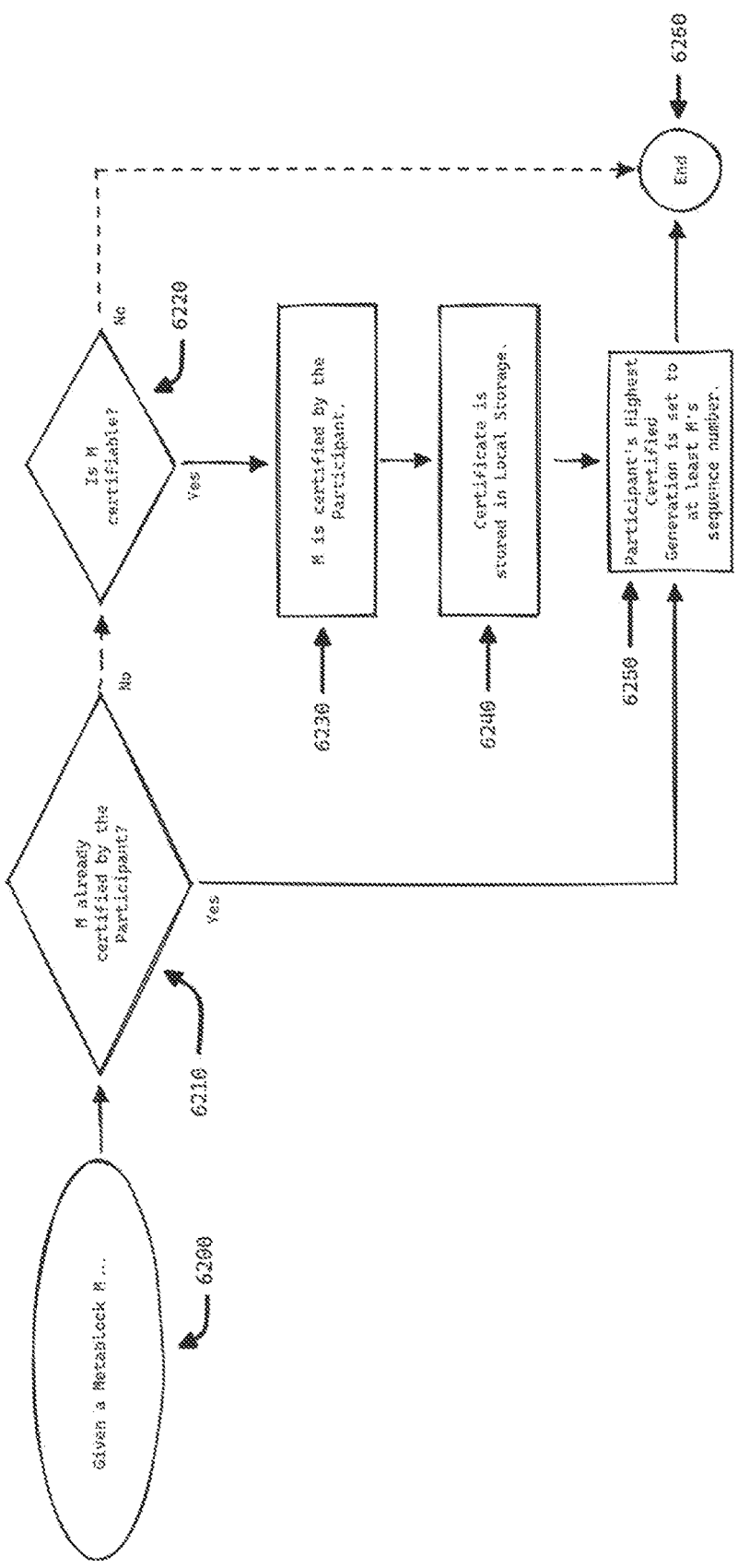
FIG. 6B shows a flowchart of certifying a Metablock.

Referring also to FIG. 6B, when a Participant tries to certify a Metablock M 6200, it will check if M was already certified 6210 by that Participant; if it was, the Participant's HCG is set to at least M's sequence number 6250, and certification ends 6260. If M was not already certified, the Participant will check if M "Is Certifiable"; if it is, the Participant will certify M 6230, the certificate will be stored in the Participant's Local Storage 6240, and the Participant's HCG will be set to at least M's sequence number 6250. When a new certificate created by a Participant is stored in the Participant's Local Storage 6240, the Participant will have observed this new certificate (as shown in FIG. 6A, and further described herein), and perform the corresponding actions (e.g., try to progress M 6300 and broadcast the certificate to its peers 6400). In all other cases, certification terminates early with no certificate being generated 6260.

Figure 6C:
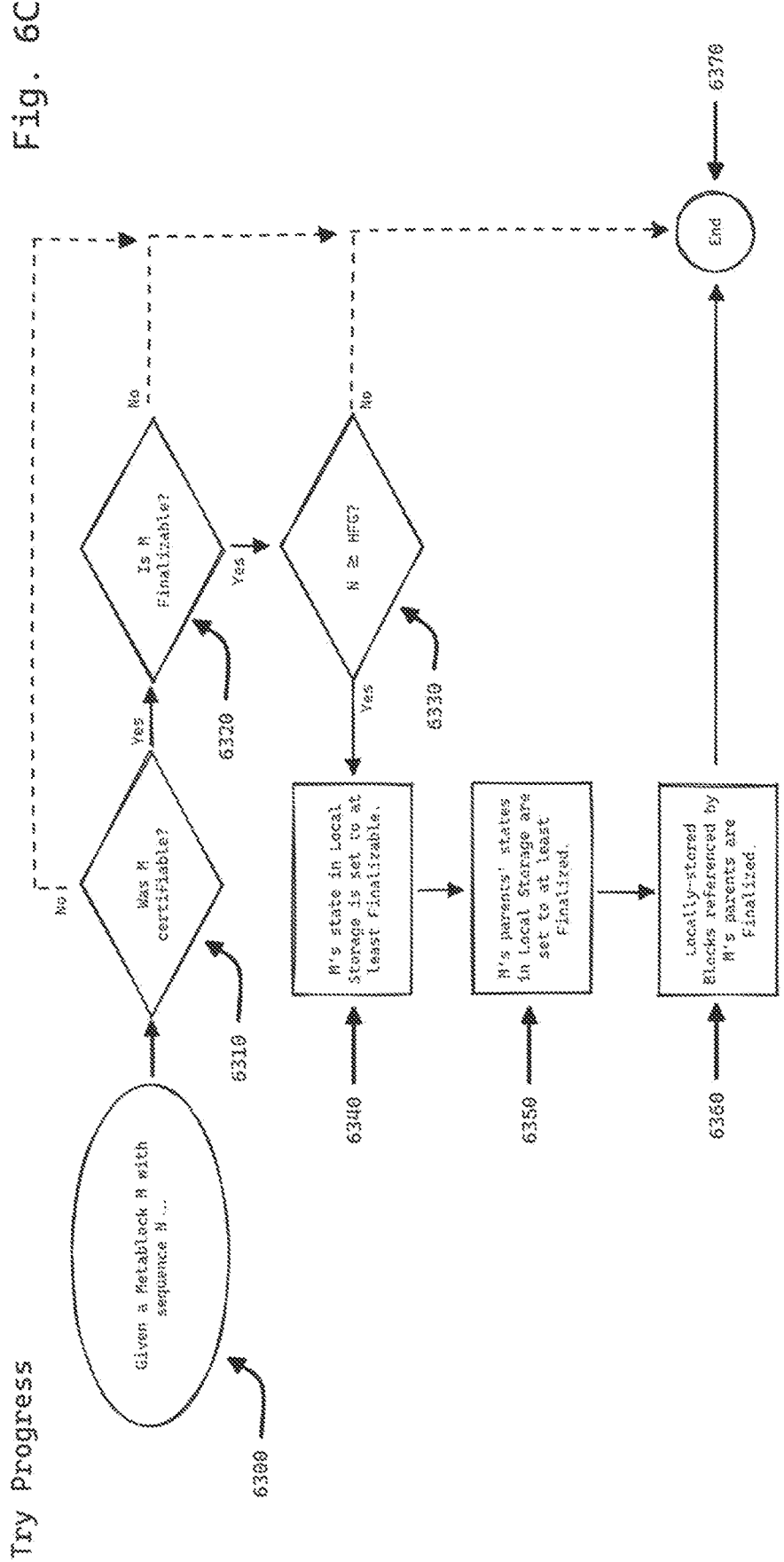
FIG. 6C shows a flowchart of progressing a Metablock's state.

Referring also to FIG. 6C, when a Participant tries to progress the state of a Metablock M with sequence number N 6300, it will check if M "Was Certifiable" 6310, "Is Finalizable" 6320, and if N>=the Participant's HFG 6330. If all of these checks pass, M's state in local storage will be set to at least Finalizable 6340, M's parents' states in local storage will be set to at least Finalized 6350, and any locally-stored Blocks referenced by M's parents will be Finalized 6360. In all other cases, progression terminates early with no action taken 6370.

The state of a given Metablock does not necessarily need to be stored by a Participant, as it may be derived at any time from the structure of a Metablockchain (and the certificates corresponding to any Metablocks in the Metablockchain). However, to simplify the descriptions in this specification, we assume a Participant will store in it's local storage the last derived state for every Metablock it has observed.

When a Participant observes a Certificate C for a Metablock M 6600, it will check if M is in the it's Local Storage 6700. If M is stored locally, the Participant will proceed with the same steps as when M was initially observed 6000 but, instead of broadcasting M, the Participant will broadcast C 6400. If M is not stored locally 6700, the Participant will skip these steps, and immediately broadcast C 6400.

When a Participant successfully progresses the state of a parent of a Metablock M 6650, it will check if M is in it's Local Storage 6700. If M is stored locally, the Participant will proceed with the same steps as when M was initially observed 6000. In either case, no additional data will be broadcast to the Participant's peers 6400.

Referring also to FIG. 6D, conflict detection and resolution occurs only when a Participant tries to prepare a Metablock M with sequence number N 6900. The Participant will first check if N>=HCG 6910 and if N>0 6920. If both checks pass, the Participant will find 6930 all valid, potential parents for M within Local Storage; if any potential parent has a conflict with another potential parent, only the parents which win conflict resolution will be kept. Once the Participant finds a set of valid, non-conflicting parents for M, it will assign 6940 them to M. If M has at least one parent

6950, the Participant may select 6960 a number of Blocks from its Local Storage which are not in M's Finality Window, and are not finalized, as Blocks to include in M. If M's Finality Window contains at least one Block 6970, M will be certified 6980 by the Participant and stored in it's Local Storage. If N>=HCG 6910, but N=0 6920, the Participant can skip parent selection and go directly to Block selection 6960. In all other cases, no Metablock is created, and preparation terminates early 6990.

Metablocks may be prepared at any time by any Participant. In the preferred embodiment, a Participant may try to prepare a Metablock at a configurable interval (e.g., every 100 milliseconds) or when a configurable number of Blocks are observed (e.g., every 100 Blocks), and may prefer preparing a Metablock in the generation immediately following the Participant's HFG.

In some embodiments, a Participant may resolve the conflict between two conflicting Metablocks A and B by choosing the Metablock with the "lower" Issuing Hash (which is the Hash of the Digital Signature in a Metablock's Issuing Certificate). When used in this way, the Issuing Hash is equivalent to a Verifiable Random Function (VRF). Informally, a VRF generates a distinct and unpredictable output O for any input data M, along with a signature S that certifies that O was derived from M. Some Digital Signature algorithms are guaranteed to produce a distinct signature for each input, and can thus be used to produce a distinct S for any M. However, this S cannot be used as an O, since S may contain predictable patterns specific to the given Digital Signature algorithm. However, by Hashing S, a distinct and unpredictable O is created, since the Hash of S is not predictable; thus, some Digital Signature algorithms may be combined with a cryptographic Hashing algorithm to create a VRF.

In some embodiments, a Participant may choose to limit the number of parents assigned to a Metablock to some maximum number L. If a Participant finds 6930 more than L valid, non-conflicting Metablocks, it may sort the Metablocks in descending order by their Issuing Hashes, and select 6935 the first L Metablocks (i.e., the L Metablocks with the "highest" Issuing Hashes). This rule, in conjunction with the conflict resolution rule described in the previous paragraph, discourages Participants from preparing Metablocks with deliberately "low" or "high" Issuing Hashes.

In some embodiments, it may be desirable for Blocks in the same Causal Group to have a predetermined ordering, even before they are finalized by a Confirmed Metablock. In these embodiments, the Block data structure may be extended with a "causal sequence" number 530. Each time a Block is issued in a Causal Group, it may be assigned a causal sequence that is one greater than the previous Block issued in the same Causal Group. A causal sequence of 0 may be used to indicate there is no predetermined ordering for a Block, and a causal sequence of 1 may be used for the first Block issued in a Causal Group. To enforce this ordering, the "Was Certifiable" predicate may be extended with an additional "Is Causally Consistent" predicate, which is applied to each Block in a Metablock. A Block B with causal sequence N in a Metablock M "Is Causally Consistent" on a specific Participant P if N=0, or if all of the following statements are true: 1) B appears exactly once in M's Finality Window, 2) N>P's HFCS, 3) N=1, N=P's HFCS+1, or M's Finality Window contains the Block with causal sequence N−1. In essence, this predicate requires that, if a Block has a non-zero causal sequence N, then the Block with N−1 must be a Finalized Block before the Block with N becomes a Finalized Block.

The Data Backbone system provides a framework and runtime for the execution of Behaviors and sequences of Behaviors called Sagas. Each Participant in the Data Backbone contains a Saga Runtime capable of executing these Sagas.

Referring also to FIG. 7, Sagas are defined by a unique Entry in a Saga Description Pact shared by all Sagas. Every Saga in a World has at least one Entry in the Saga Description Pact, and must define its own corresponding Pact comprising the fields of the Saga State Pact that is unique to that Saga.

Every Entry in the Saga Description Pact is a Saga Description 700 that, at a minimum, contains an ordered list of References to Entries in the Saga Stage 710 Pact, a Reference to the Pact which initiates the Saga, and a Reference to the Saga's corresponding Saga State Pact. The first referenced Saga Stage in the Saga must consume the initiating Pact of the Saga, where "consume" means the Saga Stage's Behavior is capable of processing one or more Entries described by the Pact, and optionally is capable of "producing" (creating) one or more Entries as the result of this processing, which are described by the same Pact and/or one or more different Pacts.

Every Entry in the Saga Stage Pact is a Saga Stage 710 that, at a minimum, contains a Reference to a Behavior, a Reference to the Pact consumed by the Behavior (and thus the Pact consumed by the Saga State), a list of References to zero or more Pacts which are accessed (read) by the Saga Stage's Behavior, and a list of References to zero or more Pacts which are produced (written) to by the Saga Stage's Behavior.

Every Entry in a Pact comprising a Saga State Pact is a Saga State 720 that, at a minimum, contains a Reference to the previous Entry (Saga State) in that Saga State's corresponding Saga Invocation (if it is not the first Partial Saga State for a Saga Invocation), a Reference to the Saga Description that was invoked to produce that Saga State, a Reference to the Saga Stage that was invoked to produce that Saga State, a Reference to the Entry that was consumed by that Saga Stage, and a list of zero or more References to the Entries produced (created) by that Saga Stage.

Figure 8:
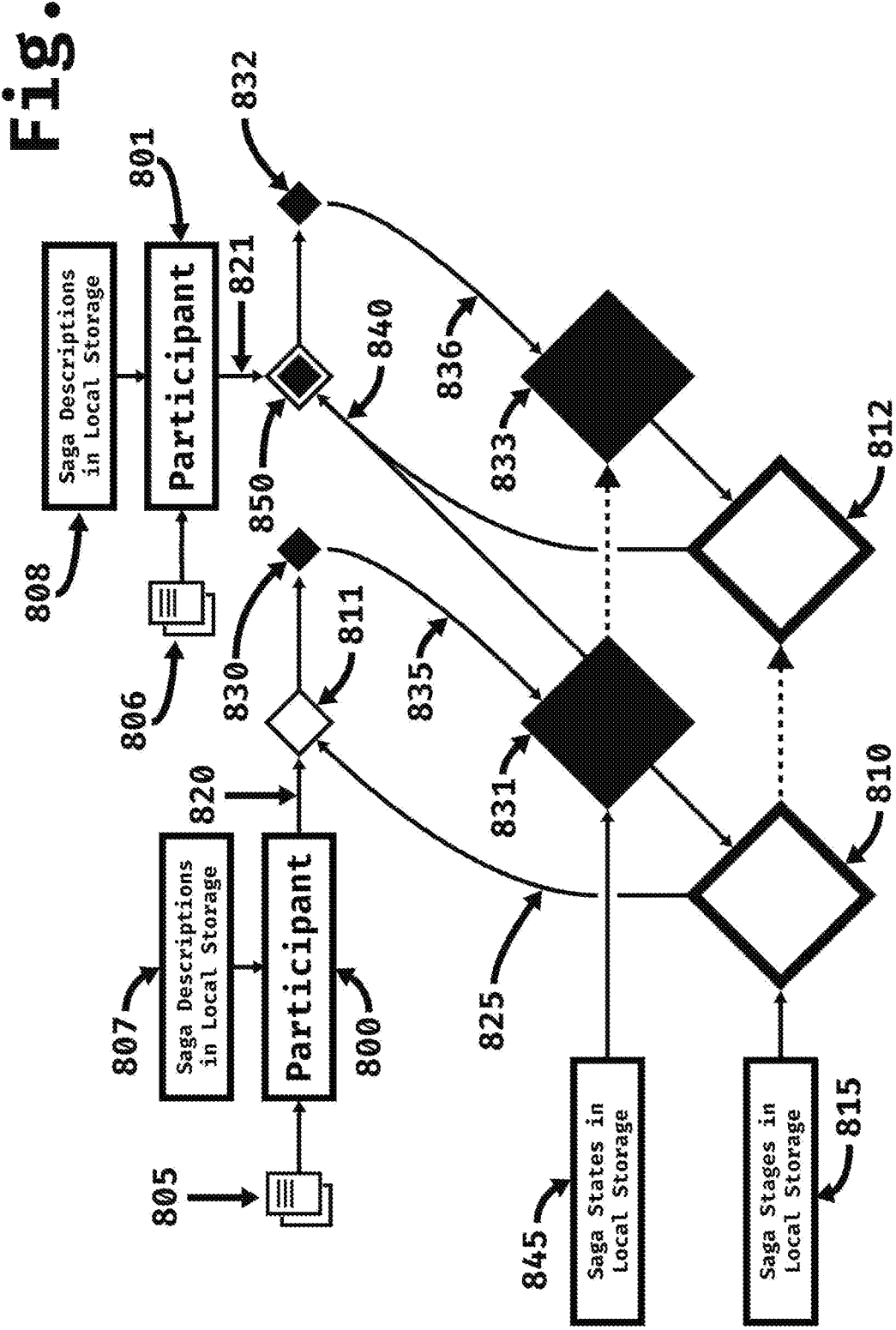
FIG. 8 shows a representation of the lifecycle of a Saga Description, its Saga Stages, and its Saga States.

Referring also to FIG. 8, when a Participant 800 observes a new Entry 805 which is in the initiating Pact of a Saga Description that the Participant has in its Local Storage 807, the Participant invokes the Saga Description with that Entry 820 via the Saga Runtime. The Saga Runtime then retrieves 825 the first Saga Stage 810 from the Saga Stages in Local Storage 815 and invokes it with an empty (new) Saga State 811 and passes it the Entry 805 observed by the Participant 800. When the Saga Stage completes executing, the Saga Runtime produces a new Saga State 830 which is stored 835 as a Saga State Entry 831 in the Saga States in Local Storage 845.

When a Participant 801 contains a Pending Saga State 831 in its Local Storage 845 for which it has a corresponding Saga Description in its Local Storage 808, and it receives a new Entry 806 which is consumed by the next Saga Stage 812 to invoke for that combination of Pending Saga State and Saga Description, the Participant invokes 821 the Saga Description with the Entry 806 via the Saga Runtime. The Saga Runtime then retrieves 840 the Pending Saga State 831 from its Saga States in Local Storage 845 and the next Saga Stage 812 from its Saga Stages in Local Storage 815. The Saga Runtime then invokes the Saga Stage with the Pending Saga State 850. When the Saga Stage completes executing, the Saga Runtime produces a new Saga State 832 which is stored 836 as a Saga State Entry 833 in the Saga States in Local Storage 845.

Because a Saga Description is comprised of multiple sequential Saga Stages where each intermediary Saga State is stored on the Data Backbone, complex Saga Descriptions which trigger a "blocking" event (e.g., waiting a pre-determined amount of time, or making a request to a remote system) may be implemented as a sequence of Saga Stages, where one Saga Stage makes a request, and the next Saga Stage is initiated by a response to the request. This asynchronous functionality means a Saga may be executed wholly on one Participant, or by multiple Participants. As illustrated in FIG. 8, there is no requirement that one Saga Description be executed wholly by the Saga Runtime of one Participant. Because a particular Saga Invocation may be executed over a long or indefinite period of time, possibly in the presence of multiple network partitions or failures, Pending Saga States may be long-lived and/or used to detect and resolve timeouts in a Saga.

Regardless of how it was invoked, every Saga Stage uses the Channels described in the Data Backbone Dataflow (as illustrated in FIG. 1) to both consume Entries from and produce Entries to Pacts. This means that individual Saga Stages do not require any specialized mechanisms or implementation consideration to read, create, or distribute Entries. Further, because all of a Saga's components (e.g., Saga Stages and Saga Stages) are defined by and stored within Entries for Pacts, they are automatically stored and distributed as a part of the Data Backbone Dataflow (as illustrated in FIG. 1), allowing every invocation of a Saga to be "replayed" and for every unique state and version of a Saga to be recalled. These qualities mean that implementers of Sagas may achieve auditable "event sourcing" functionality with little to no additional configuration, and will benefit from any extensions to the performance or capabilities of the underlying Data Backbone without additional configuration.

Figure 9A:
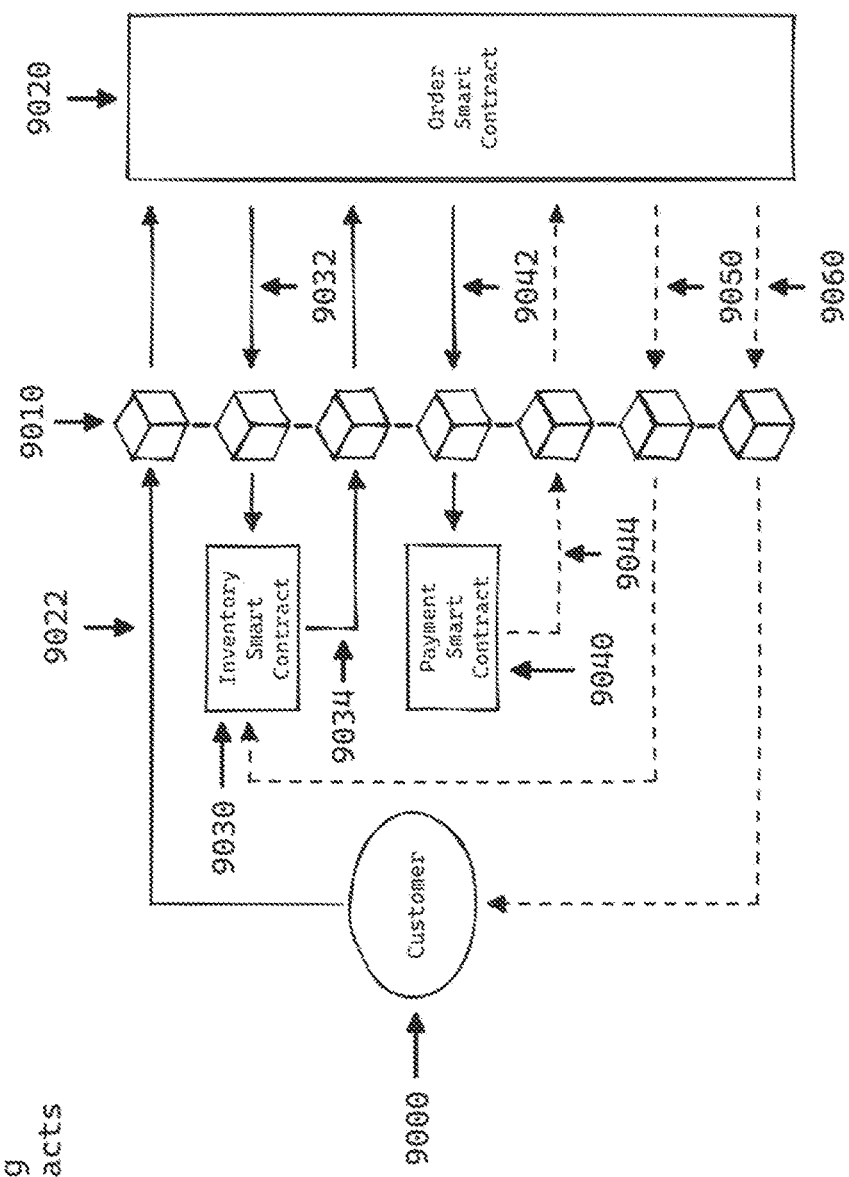
FIG. 9A shows a flowchart of executing a specific sequence of "smart contracts" in a linear blockchain of the prior art.
Figure 9B:
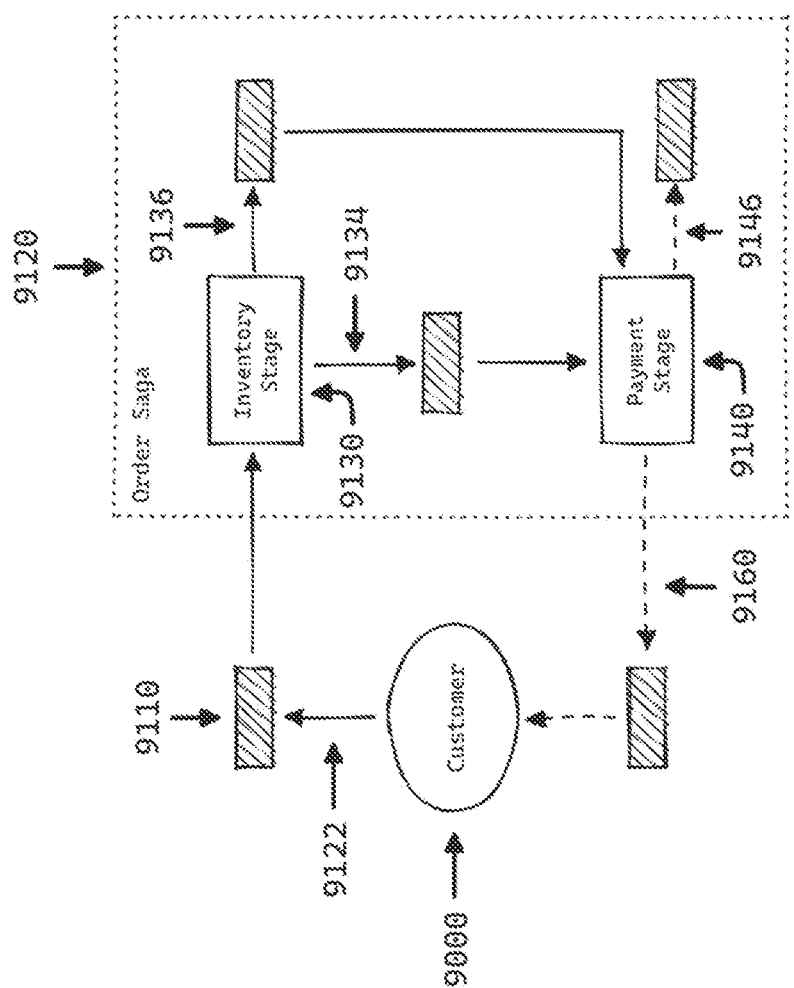
FIG. 9B shows a flowchart of executing a specific Saga.

A sequence of related Distributed Applications can be executed as a single logical transaction (e.g., as a single Saga Invocation). Referring also to FIG. 9B, consider the same example as in FIG. 9A, but where the application is implemented as a Saga 9120 comprised of a sequence Stages 9130, 9140. To initiate an order, the customer 9000 pushes 9122 an Entry 9110 in the Saga's initiating Pact. Once the Entry is finalized, the first stage 9130 of the application Saga 9120 receives the Entry and successfully retrieves the ordered product from the warehouse, pushing 9136 a Pending Saga state Entry for the order, and pushing 9134 a Entry in the Pact consumed by the second Stage 9140 to collect payment for the ordered product.

The second stage fails to collect payment due to insufficient funds, pushing 9146 a final Saga State recording the failure, and pushing 9160 a Entry notifying the customer that their order failed.

In the example of using conventional smart contracts, a minimum of seven finalized transactions (across seven finalized blocks in a blockchain) will be created, leading to a high best-case latency. Additionally, the application smart contract which is "orchestrating" the calls to other smart contracts must manually submit compensating transactions for all previously executed transactions whenever a smart contract fails to execute. Conversely, in the example of using Sagas, a maximum of five finalized Entries will be created. Depending on the embodiment of the Saga Runtime, some of these Entries may be processable before they are referenced by any finalized Metablock (e.g., if a Participant executing a Saga and/or Stage is the sole owner of all the Pacts involved in the Saga and/or Stage, it may choose to treat the Entries as locally finalized immediately), leading to a low best-case latency.

Because the "interfaces" between Stages in a Saga are comprised solely of Pacts, the Metablockchain consensus algorithm may automatically order and finalize Sagas' Entries in parallel without any additional consensus or ordering algorithms.

Some embodiments of a Saga Runtime may enable Stages to declare "compensating" Behaviors. In these embodiments, the author of the application Saga 9120 would not need to create compensating Entries when a Stage fails to execute—these Stages' compensating Behaviors may be automatically invoked by the Saga Runtime, potentially without creating any additional Entries.

Other Embodiments

The Data Backbone system may be extended to allow individual Pacts or Sagas to "prefer", recognize, or otherwise be bound to Participants running on physical or virtual systems with certain properties (e.g., general-purpose input-output interfaces, network sockets, or even more complex features like robotic arms or drivetrains).

Extending the Data Backbone system in this way allows users of the system to create more advanced applications that ensure data and Sagas are stored and executed on systems capable of supporting them.

In the preferred embodiment, every Participant runs the same Data Backbone software. However, this software can be coded in a wide range of programming languages, split into an arbitrary number of components and/or objects, and implemented as an arbitrary number of subroutines or coroutines.

A Participant's Local Storage system may be implemented in a variety of ways using a variety of techniques and technologies (including, for example, modern databases like MongoDB or Oracle RDBMS and modern in-memory data grids like Hazelcast or Memcached), so long as the Local Storage system maintains the ability to be accessed concurrently by multiple Channels connected to the Participant. Channels may be implemented in such a way that they are on different systems, on the same system, or even in the same process as the Participant they are connected to.

The mechanisms by which Avatars exchange data can be implemented in a variety of ways using a variety of techniques and technologies (including, for example, modern messaging systems like Kafka, Protocol Buffers, or lightweight TCP, IP, or RS-232 connections), so long as the Avatars maintain the ability to verify one another's identities and exchange data relevant to the Data Backbone.

The specific data structures and names of Pacts, Entries, Blocks, Metablocks, and Sagas (and any related data structures) may be drastically modified-so long as they approximate the qualities described in the figures-without departing from the spirit of the method and system disclosed herein. In fact, some of these data types could even be combined without fundamentally altering the characteristics of the Data Backbone.

The specific mechanism by which individual Saga Stages are executed could be implemented in a wide range of ways, using a variety of scheduling, serialization, and execution techniques. At the discretion of the Data Backbone runtime and/or the Saga Descriptions, a Saga State could be specific to a particular invocation of a Saga Description (e.g., a transaction state), it may be persistent across all invocations of the Saga Description (e.g., an actor state), or some combination thereof (e.g., a state associated with a unique identifier). Further, Saga Stages may be extended to declare "compensating" or "reversal" Saga Stages which refer to other Saga Stages which should be invoked when a Saga Stage in a Saga Stages fails or times out, and requires all prior Saga Stages to be undone or compensated for in order to maintain a consistent Saga State.

The specific nature, structure, and capabilities of the schemas described by Pacts may be extended or implemented to include a wide range of features. For example, Pacts may support "inheritance", which is a common requirement for systems that rely on "extensions" of the same fundamental datatype. Furthermore, the mechanisms by which Channels or users of the Data Backbone system query Pact data are many; for example, a GraphQL or SQL-based query language may be built on top of or into the Pact structure.

As developing technologies update or modify mechanisms used for consensus and conflict resolution, similar modifications may be made to the structure of the Metablockchain or the SIC-DAG that retain the general characteristics of the system—the ability for any Participant or Peer to participate with only knowledge of one "generation" of node data, and for an arbitrary number of nodes to enter the same generation simultaneously. For example, a mechanism for detecting and resolving conflicts within two nodes in a Metablock-based SIC-DAG (i.e., a Metablockchain) would be to include logical clocks (e.g., Lamport Clocks or Vector Clocks), allowing the newer or older Metablocks (depending on a configurable policy) to always "win" in a conflict. Further, these consensus rules could be stored within a dedicated Pact that all Participants read from and write to, providing a method of changing or updating a consensus policy without a "hard fork" of the Data Backbone.

Creating, distributing, and storing the Certificates for Metablocks could quickly become a challenge in large Metablockchains. For this reason, Certificates (and the corresponding Metablock state progression criteria) could be replaced with "virtual certificates" that are inferred from the structure of a Metablockchain. For example, if some Metablock M issued by Participant P has parents A, B, and C, it can be inferred that P "virtually" certifies A, B, and C because it observed them as valid parents of M.

The properties of Channels and Entries could be extended to implement the interfaces or fulfill the contracts of reactive or functional programming interfaces, e.g. ReactiveX (and its children projects, RxJava, RxJs, etc.).

The operations of block and metablock creation, finalization, and transmission may be implemented in any blockchain system, where participants create, certify, and transmit blocks and metablocks but may operate other software than a Data Backbone. On a participant, blocks are created with a reference to a pact the block's entries conform to, a list of references to the participants which own the block, a reference to an ordered list of entries in the block, and a certificate over the block's data provided by the participant. A block may be considered finalized on a participant when a metablock referencing the block is finalized, and the block is stored in the participant's block stack. If, upon creating a block, the block has no causal ordering, the creating participant may assign it the causal sequence 0. Otherwise, if the block is the first block created by the participant in the corresponding sync group, the participant may assign it the causal sequence 1. Otherwise, the participant may assign it the causal sequence of one greater than the causal sequence of the previous block created by the participant in the corresponding sync group. A block may also be considered finalized by a participant when a metablock finalizing the block is finalized, the block is stored in the participant's block stack, and the block is causally consistent. A block may also be considered finalized by a participant when the block was created by the participant, the participant is the sole owner of the block, and the block is causally consistent. A participant may observe a new block by creating the block or receiving the new block from another participant, storing the new block in the block stack of its sync group, and transmitting the block to zero or more peer participants. A participant may create a metablock comprising a list of references to zero or more blocks and a certificate over the metablock's data provided by the participant. A participant may derive a list of participants that must certify a metablock comprising a first list of sets of owners for each of the metablock's referenced blocks, a second list of sets of owners for each of the metablock's parent's referenced blocks, and a third list of the issuers of each of the metablock's parents, and may consider the metablock finalizable when the metablock is certified by a quorum of the participants in each of the lists. Each reference in the metablock's list of references may be a block header comprising a reference to a pact the block's entries conform to, a list of references to the participants which own the block, a hash of an ordered list of entries in the block, and a certificate over the block header's data provided by the participant. This use of block headers enables blocks' identities and metadata to be recorded publicly, while the issuers keep the blocks' data private, thereby allowing sharing and voting on a block without exposing or transmitting its entry data. A participant may observe a new block header by: either creating the block header, receiving the block header from another participant, or receiving the block corresponding to the new block header from another participant; storing the block header in the block stack of its sync group; and transmitting the block header to zero or more peer participants. A participant may observe a new metablock by: either creating the metablock, or receiving the new metablock from another participant; storing the metablock in a unique metablockchain of the participant; and transmitting the metablock to zero or more peer participants.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of operating a Data Backbone comprising:
   operating one or more computing devices having memory, storage, a processor, and a local storage of the computing device;
   operating software on one of the computing devices to act as a participant within the data backbone;
   operating a saga runtime to execute one or more behaviors;
   creating a unique metablockchain as a single-generation independently consolidated directed acyclic graph (SIC-DAG);
   connecting to one or more channels which access one or more sync groups;
   for each accessed sync group, establishing an entry buffer and a block stack within the local storage, and allowing the connected channel of the accessed sync group to read from and write to the entry buffer;

moving one or more entries from the entry buffer into a new block, signing the new block with a digital signature of the participant, placing the new block in the block stack, and transmitting the new block to one or more peer participants;

processing each metablock in the metablockchain as a node in the SIC-DAG;

assigning to each node in the SIC-DAG a sequence number equal to or greater than 0;

assigning to one or more genesis nodes in the SIC-DAG the sequence number 0;

requiring that each non-genesis node with the sequence number greater than 0 contains references to one or more valid prior generation nodes having the sequence number of 1 less than the sequence number of the non-genesis node and such that the one or more valid prior generation nodes do not contain conflicting or potentially conflicting data;

requiring that each metablock contains one or more references to one or more different blocks which do not contain conflicting or potentially conflicting data, and a certificate issued by a creating participant that created the metablock;

observing a new certificate for a metablock by creating the new certificate or receiving the new certificate from another participant;

broadcasting the new certificate to one or more other participants;

observing a new metablock by either:
  receiving the new metablock from another participant, or
  creating the new metablock with references to one or more observed blocks and a certificate of the participant;

upon observing the new metablock and the new metablock requires a certificate from the participant to achieve a finalizable state:
  if the certificate from the participant for the observed metablock is already stored in the local storage, setting a highest certified generation of the participant to at least the sequence number of the observed metablock;
  if the certificate from the participant for the observed metablock is not already stored in the local storage:
    if the observed metablock is certifiable:
      storing the certificate from the participant in the local storage; and
      setting the highest certified generation of the participant to at least the sequence number of the observed metablock;

progressing the state of the observed metablock, when the observed metablock was certifiable with an is finalizeable state and the observed metablock's sequence number is greater than or equal to the highest finalizable generation of the participant, by:
  setting the state of the observed metablock to at least finalizable;
  setting the states of all parents of the observed metablock to at least finalized; and
  setting the states of all blocks referenced by parents of the observed metablock to finalized;

setting the state of the observed metablock to finalizable when the state is prepared and the participant has in local storage certificates from every participant owning each block referenced by the observed metablock, from at least two-thirds of the participants owning each block referenced by parents of the observed metablock, and from each participant that created a parent of the observed metablock;

storing the new metablock in the unique metablockchain;
transmitting the new metablock to one or more other participants;

observing a new entry in an initiating pact of a saga description stored within the local storage;
invoking the saga description with the new entry through the saga runtime;
retrieving a first saga stage from one or more saga stages in the local storage;
invoking the first saga stage with an empty saga state and passing the new entry to the first saga stage;
when the first saga stage completes executing, producing a new saga state as a saga state entry and storing the saga state entry in the local storage;
containing a pending saga state with a corresponding saga description in the local storage;
receiving a different new entry which is consumed by a next saga stage when invoked for the pending saga state and the corresponding saga description;
invoking the corresponding saga description with the different new entry through the saga runtime;
retrieving the pending saga state and the next saga stage;
invoking the next saga stage with the pending saga state; and
when the next saga stage completes executing, producing a different new saga state as a different saga state entry and storing the different saga state entry in the local storage.

2. A data backbone system comprising:
one or more computing devices, wherein each computing device has memory, storage, a processor, a local storage of the computing device, and software stored on non-transient computer-readable media programming the computing device to:
operate as a participant within the data backbone; and
operate a saga runtime to execute one or more behaviors.

3. The system of claim 2, wherein the software is further programming the computing device to:
create a unique metablockchain;
connect to one or more channels which access one or more sync groups;
for each accessed sync group, establish an entry buffer and a block stack within the local storage, and allow the connected channel of the accessed sync group to read from and write to the entry buffer; and
move one or more entries from the entry buffer into a new block, sign the new block with a digital signature of the participant, place the new block in the block stack, and transmit the new block to one or more peer participants.

4. The system of claim 3, wherein:
the metablockchain is a single-generation independently consolidated directed acyclic graph (SIC-DAG);
each metablock in the metablockchain is a node in the SIC-DAG;
each node in the SIC-DAG contains a sequence number equal to or greater than 0;
one or more genesis nodes in the SIC-DAG contain the sequence number 0;
each non-genesis node with the sequence number greater than 0 contains references to one or more valid prior generation nodes having the sequence number of 1 less than the sequence number of the non-genesis node and such that the one or more valid prior generation nodes do not contain conflicting or potentially conflicting data; and each metablock further contains one or more references to one or more different blocks which do not contain conflicting or potentially conflicting data, and a certificate issued by a creating participant that created the metablock.

5. The system of claim 4, wherein the software is further programming the computing device to:

observe a new metablock by either:
  receiving the new metablock from another participant, or
  creating the new metablock with references to one or more observed blocks and a certificate of the participant;
store the new metablock in the unique metablockchain; and
transmit the new metablock to one or more other participants.

6. The system of claim 5, wherein the software is further programming the computer device to:

upon observing the new metablock and the new metablock requires a certificate from the participant to achieve a finalizable state:
  if the certificate from the participant for the observed metablock is already stored in the local storage, set a highest certified generation of the participant to at least the sequence number of the observed metablock;
  if the certificate from the participant for the observed metablock is not already stored in the local storage:
    if the observed metablock is certifiable:
      store the certificate from the participant in the local storage; and
      set the highest certified generation of the participant to at least the sequence number of the observed metablock.

7. The system of claim 5, wherein the software is further programming the computer device to:

progress the state of the observed metablock, when the observed metablock was certifiable with an is finalizeable state and the observed metablock's sequence number is greater than or equal to a highest finalizable generation of the participant, by:
  setting the state of the observed metablock to at least finalizable;
  setting the states of all parents of the observed metablock to at least finalized; and
  setting the states of all blocks referenced by parents of the observed metablock to finalized.

8. The system of claim 7, wherein the software is further programming the computer device to:

set the state of the observed metablock to finalizable when the state is prepared and the participant has in local storage certificates from every participant owning each block referenced by the observed metablock, from at least two-thirds of the participants owning each block referenced by parents of the observed metablock, and from each participant that created a parent of the observed metablock.

9. The system of claim 4, wherein the software is further programming the computer device to:

observe a new certificate for a metablock by creating the new certificate or receiving the new certificate from another participant; and broadcast the new certificate to one or more other participants.

10. The system of claim 4, wherein the software is further programming the computer device to:

identify two metablocks in conflict;
compare a hash of a digital signature in the certificate of the creating participant of each metablock; and
resolve the conflict by retaining the metablock having the lower compared hash.

11. A method of operating a Data Backbone comprising:

operating one or more computing devices having memory, storage, a processor, and a local storage of the computing device;
operating software on one of the computing devices to act as a participant within the data backbone:
operating a saga runtime to execute one or more behaviors;
creating a unique metablockchain;
connecting to one or more channels which access one or more sync groups;
for each accessed sync group, establishing an entry buffer and a block stack within the local storage, and allowing the connected channel of the accessed sync group to read from and write to the entry buffer; and
moving one or more entries from the entry buffer into a new block, signing the new block with a digital signature of the participant, placing the new block in the block stack, and transmitting the new block to one or more peer participants.

12. The method of claim 11, further comprising:

creating the metablockchain as a single-generation independently consolidated directed acyclic graph (SIC-DAG);
processing each metablock in the metablockchain as a node in the SIC-DAG;
assigning to each node in the SIC-DAG a sequence number equal to or greater than 0;
assigning to one or more genesis nodes in the SIC-DAG the sequence number 0;
requiring that each non-genesis node with the sequence number greater than 0 contains references to one or more valid prior generation nodes having the sequence number of 1 less than the sequence number of the non-genesis node and such that the one or more valid prior generation nodes do not contain conflicting or potentially conflicting data; and
requiring that each metablock contains one or more references to one or more different blocks which do not contain conflicting or potentially conflicting data, and a certificate issued by a creating participant that created the metablock.

13. The method of claim 12, further comprising:

observing a new metablock by either:
  receiving the new metablock from another participant, or
  creating the new metablock with references to one or more observed blocks and a certificate of the participant;
storing the new metablock in the unique metablockchain; and
transmitting the new metablock to one or more other participants.

14. The method of claim 13, further comprising:

upon observing the new metablock and the new metablock requires a certificate from the participant to achieve a finalizable state:

if the certificate from the participant for the observed metablock is already stored in the local storage, setting a highest certified generation of the participant to at least the sequence number of the observed metablock;

if the certificate from the participant for the observed metablock is not already stored in the local storage:

if the observed metablock is certifiable:

storing the certificate from the participant in the local storage; and setting the highest certified generation of the participant to at least the sequence number of the observed metablock.

15. The method of claim 13, further comprising:

progressing the state of the observed metablock, when the observed metablock was certifiable with an is finalizeable state and the observed metablock's sequence number is greater than or equal to a highest finalizable generation of the participant, by:

setting the state of the observed metablock to at least finalizable;

setting the states of all parents of the observed metablock to at least finalized; and setting the states of all blocks referenced by parents of the observed metablock to finalized.

16. The method of claim 15, further comprising:

setting the state of the observed metablock to finalizable when the state is prepared and the participant has in local storage certificates from every participant owning each block referenced by the observed metablock, from at least two-thirds of the participants owning each block referenced by parents of the observed metablock, and from each participant that created a parent of the observed metablock.

17. The method of claim 12, further comprising:

observing a new certificate for a metablock by creating the new certificate or receiving the new certificate from another participant; and broadcasting the new certificate to one or more other participants.

18. The method of claim 12, further comprising:

identifying two metablocks in conflict;

comparing a hash of a digital signature in the certificate of the creating participant of each metablock; and resolving the conflict by retaining the metablock having the lower compared hash.

* * * * *